United States Patent
Hendershot

[15] 3,650,305
[45] Mar. 21, 1972

[54] VALVE FOR DISPENSING MEASURED QUANTITIES OF LIQUID

[72] Inventor: Richard E. Hendershot, Los Angeles, Calif.

[73] Assignee: Harvey Dental Specialty Company, Gardena, Calif.

[22] Filed: Jan. 29, 1970

[21] Appl. No.: 6,827

[52] U.S. Cl..................141/50, 141/55, 141/284, 141/363, 222/332, 251/310
[51] Int. Cl................................B65b 31/00, B67c 3/00
[58] Field of Search....................222/332, 363, 368; 141/50, 141/54, 55, 250, 284, 285, 307, 363, 387; 137/609; 251/310

[56] References Cited

UNITED STATES PATENTS

| 327,448 | 9/1885 | Luhmann | 222/332 |
| 1,879,109 | 9/1932 | Coy | 222/332 |

Primary Examiner—Houston S. Bell, Jr.
Attorney—Smyth, Roston and Pavitt

[57] ABSTRACT

A valve is equipped with a measuring chamber to release predetermined increments of liquid into a pressurized receptacle, the valve having a first limit position for filling the metering chamber from a liquid reservoir, a second opposite limit position for emptying the measuring chamber into the receptacle, a third intermediate position to vent the metering chamber and a fourth position in its range of positions to vent the receptacle.

11 Claims, 7 Drawing Figures

Patented March 21, 1972
3,650,305
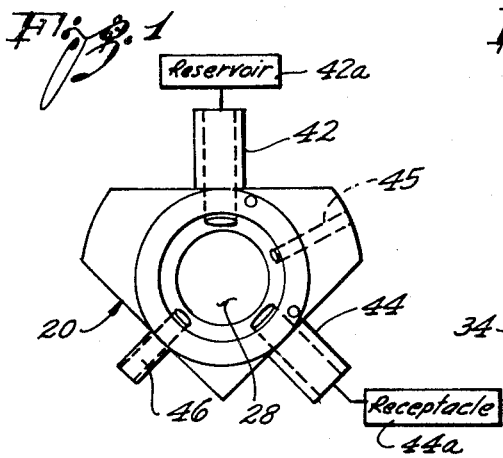
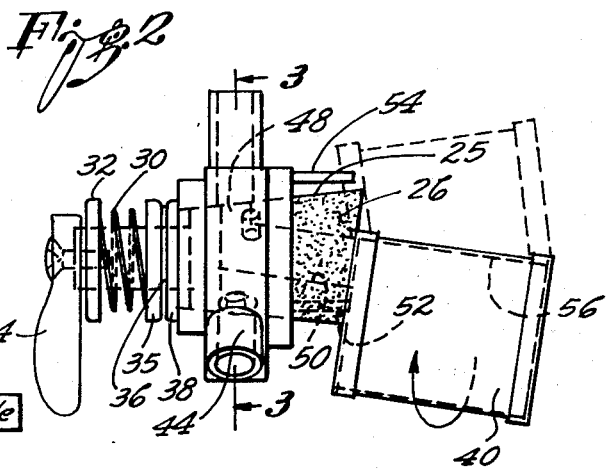
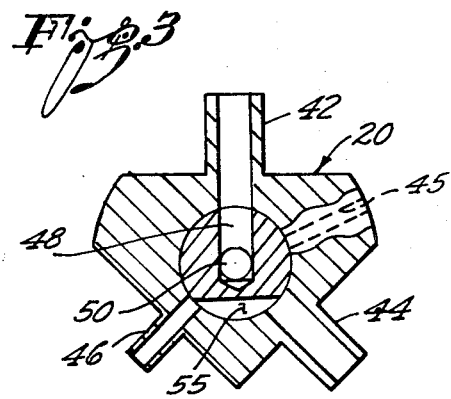
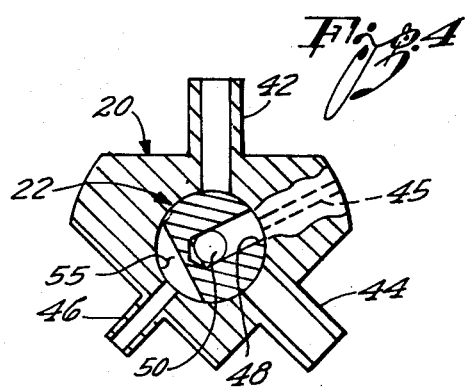
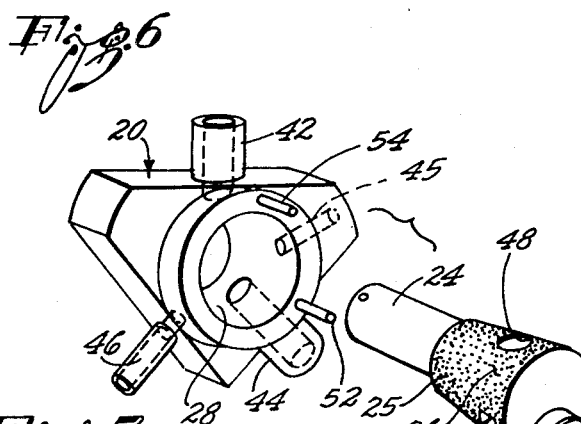
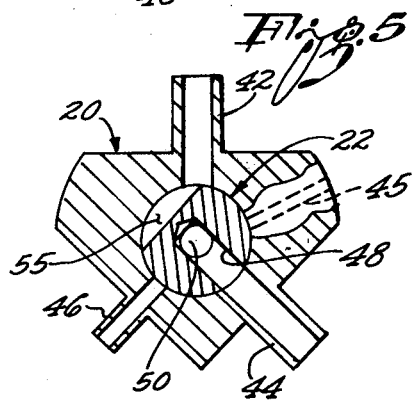
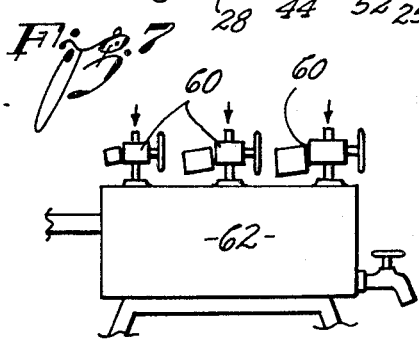
INVENTOR:
Richard E. Hendershot
ATTORNEYS

VALVE FOR DISPENSING MEASURED QUANTITIES OF LIQUID

BACKGROUND OF THE INVENTION

The invention relates to a valve to be connected, for example to a sterilizer of the general character disclosed in the Jewel et al. U.S. Pat. No. 2,613,130 and in the Lanyon U.S. Pat. No. 2,834,515. In the Jewel et al. disclosure, for example, the valve member is movable between a first position and a second position, the first position serving to connect a reservoir for a volatile germicide to a measuring chamber to fill the measuring chamber by gravity and the second position serving to empty the measuring chamber into a sterilizer chamber for the purpose of sterilizing such objects as surgical and dental instruments.

The first position of the valve member also serves to vent the sterilizer chamber to a condenser. Thus turning the valve member to its first position drops the pressure in the sterilizer chamber to permit the sterilizer chamber to be opened for removal of the instruments and simultaneously results in filling the measuring chamber with a new charge of liquid. When the sterilizer chamber is subsequently closed in preparation for another sterilizing operation, changing the valve member to its second position cuts off the sterilizer chamber from the atmosphere and at the same time introduces the new charge of disinfectant into the sterilizer chamber.

One of the problems involved in the construction and operation of such a valve is to insure accurate dispensation of a predetermined amount of the liquid germicide by making sure that no air is trapped in the measuring chamber when the valve member is at its first position and by making sure that all of the liquid content of the measuring chamber is released at the second position of the valve member.

While an accurate and efficient valve of this character has utility in the above described operating cycle of an instrument sterilizer, it is also broadly applicable for introducing predetermined increments of liquid into various kinds of systems. For example, it may be used to introduce additives into a continuously pressurized tank or into a pressurized pipeline. In such a use of the valve, the valve port for venting the tank or pipeline is normally cut off from the atmosphere so that normally turning the valve to its first position for filling the measuring chamber does not release pressurized fluid from the tank or pipe line.

Another problem is that emptying the measuring chamber into a pressurized receptacle such as a sterilizer chamber results in replacement of the liquid body in the measuring chamber by a pressurized body of gaseous fluid which may be vapor or air. For example, if the liquid additive in the measuring chamber is emptied into a high pressure boiler, the measuring chamber receives a charge of pressurized steam. When the measuring chamber is subsequently connected to the reservoir that contains the liquid additive, the pressurized content of the measuring chamber is disruptive or at least interferes with and delays the filling of the measuring chamber. In many instances, moreover, it is desirable to maintain the liquid reservoir at atmospheric pressure with the consequence that the pressurized vapor in the measuring chamber expands many fold with undesirable if not hazardous results as it is released into the liquid reservoir.

The present invention solves these problems and in addition teaches a relatively simple but efficient structure for such a valve.

SUMMARY OF THE INVENTION

To insure complete filling of the measuring chamber with a new charge of liquid, the path for counterflow of air or vapor from the measuring chamber to the liquid reservoir is made relatively short and the path is further arranged to be continuously uphill with no obstacles to trap the returning air or vapor. The return path is shortened by mounting the measuring chamber directly on the valve member and continuously upward inclination of the return path is provided by tilting the measuring chamber upward towards the reservoir and by further tilting the valve passage upward towards the reservoir. As a result the gas or vapor content of the measuring chamber bubbles up through the liquid in the reservoir and the measuring chamber is promptly and completely replaced by a new charge of liquid from the reservoir.

When the valve member is rotated to its second position for dispensing the measured liquid charge, both the tilt of the measuring chamber and the tilt of the valve passage are reversed to provide a relatively short and continuously descending path from the measuring chamber into the pressurized tank or pipeline. The result is prompt and complete emptying of the liquid content of the measuring chamber.

The problem of avoiding the release of highly pressurized gaseous fluid into the liquid reservoir is met by providing a third position of the valve member intermediate its first and second position at which intermediate position the measuring chamber is placed in communication with an upper vent port of the valve. The vent port may be open to the atmosphere and lead to a suitable muffler or the vented vapor may be led to a suitable condenser.

In turning the valve from its first position to its second position to empty the measuring chamber, the measuring chamber is momentarily in communication with the vent port but since the vent port is above the level of the measuring chamber no liquid is lost from the measuring chamber. When the valve is turned back to its first position after the liquid content of the measuring chamber is discharged, momentary connection of the measuring chamber with the vent port occurs again and this time it releases pressure from the measuring chamber with the result that the measuring chamber is at atmospheric pressure when it is again connected to the liquid reservoir.

The features and advantages of the invention may be understood from the following detailed description and the accompanying drawings.

BRIEF DESCRIPTION OF THE DRAWINGS

In the drawings, which are to be regarded as merely illustrative:

FIG. 1 is an end elevation of the valve body with the valve member removed from the valve;

FIG. 2 is a side elevation of the valve equipped with the measuring chamber;

FIG. 3 is a transverse section along the line 3—3 of FIG. 2 showing the valve member at its first limit position where it provides a path for filling the measuring chamber with liquid and at the same time provides another path for venting the sterilizer chamber;

FIG. 4 is a sectional view similar to FIG. 3 showing the valve member turned to an intermediate position at which it connects the measuring chamber to a vent port of the valve;

FIG. 5 is a similar sectional view showing the valve member at its second limit position where it provides the path for emptying the measuring chamber into the sterilizer chamber;

FIG. 6 is an exploded perspective view of the valve and the measuring chamber that is united therewith; and FIG. 7 is a side elevational view of a pressurized tank equipped with three measuring valves for dispensing measured quantities of three different additives into the tank.

DESCRIPTION OF THE PREFERRED EMBODIMENT OF THE INVENTION

The presently preferred embodiment of the invention shown in the drawings has a valve body 20 and a valve member, generally designated 22, which, as best shown in FIG. 6, has an axial stem 24 and a tapered enlargement 25 which is of the configuration of a truncated cone. The tapered enlargement 25 of the valve member is preferably provided with a Teflon coating 26 and is rotatably mounted in a correspondingly tapered axial bore 28 of the valve body.

The valve member 22 is held snugly in the axial bore 28 of the valve body by the pressure of a coil spring 30 which surrounds the stem 24 and acts between the valve member and the valve body. The outer end of the coil spring 30 seats against a flanged disk 32 which backs against a suitable handle 34 that is fixedly mounted on the valve stem. The inner end of the coil spring 30 seats against a flanged disk 35 which backs against a Teflon washer 36 which in turn abuts against a third flanged disk 38 that abuts the valve body 20. The handle 34 may be replaced by a gear if it is desirable to operate the valve body from remote control.

The valve member 22 fixedly carries a measuring chamber 40 at its outer end and if the whole assembly is accessible for manipulation the measuring chamber 40 may serve as a handle for operating the valve.

In the present embodiment of the invention, the valve body 20 has four radial ports comprising: a first upwardly extending fill port 42 to receive liquid from a reservoir 42a; a second downwardly inclined port 44 for discharging a measured quantity of liquid into a closed receptacle 44a which may be a chamber for sterilizing surgical or dental instruments; a third upwardly inclined port 45 for venting the measuring chamber 40; and a downwardly extending fourth port 46 for venting the closed receptacle.

The conical enlargement 25 of the valve member 22 has an angular passage with a radial leg 48 and a longitudinal leg 50 and the valve member is rotatable between a first limit position shown in FIG. 3 at which the leg 48 of the angular passage registers with the fill port 42 and a second limit position shown in FIG. 5 at which the radial leg 48 of the angular passage registers with the dispensing port 44. To limit the rotation of the valve member 22 to these two limit positions, the valve body is provided with a pair of stop pins 52 and 54, as best shown in FIG. 6, to serve as stop means in mechanical cooperation with the measuring chamber 40.

At the first limit position of the valve member which is shown in FIG. 3, one side of the metering chamber abuts the lower stop pin 52 and at the opposite limit position shown in FIG. 5 the other side of the metering chamber abuts the upper stop pin 54. Thus the radial leg 48 of the angular passage of the valve member 22 is rotatable through an arc with the ports 42 and 44 at opposite ends of the arc and with the port 45 at an intermediate point of the arc.

The conical enlargement 25 of the valve member 22 is further provided with a transverse peripheral slot 55 which at the first or fill position of the valve member 22 shown in FIG. 3 serves as a passage to place the dispensing port 44 in communication with port 46 for venting the closed receptacle 44a. Preferably the port 46 is connected to a condenser (not shown) to reclaim the vapor content of the gaseous fluid that is released through the port 46. Thus in the use of the valve for dispensing measured quantities of a volatile germicide into a sterilizer chamber, the condenser recovers germicide that would otherwise be lost in vapor form.

When the valve is employed in conjunction with a sterilizer chamber in the general manner set forth in the above mentioned Jewel et al. patent, the operating cycle of the valve is as follows. With the valve member 22 in its first limit position shown in FIG. 3 and with the fill port 42 connected to a reservoir 42a of volatile liquid germicide for gravity flow from the reservoir to the valve, liquid from the reservoir gravitates through the fill port 44 and the legs 48 and 50 of the angular passage of the valve member into the measuring chamber 40. The air or vapor in the measuring chamber that is displaced by the incoming fluid moves upward through the angular passage and the fill port to bubble through the liquid body in the reservoir.

It is important to note in FIG. 2 that at this time the longitudinal leg 50 of the angular passage in the valve member slopes downward to the measuring chamber 40 and that the measuring chamber itself is correspondingly tilted downwardly to cause the liquid to gravitate freely from the reservoir into the measuring chamber. It is also important to note in FIG. 2 that the portion of the inner wall 56 of the metering chamber that is uppermost at this first limit position of the valve member is not only inclined but is also flush with the surface of the angular passage 50 of the valve member that is uppermost at this time. Therefore, not only does liquid gravitate freely from the reservoir into the measuring chamber 40, but also the air or vapor that is displaced by the liquid flows freely along the upper side of the measuring chamber and along the upper side of the leg 50 of the angular passage to reach the liquid in the reservoir with no possibility of any air or vapor being trapped in the measuring chamber.

While the valve member 22 is at this first position for filling the measuring chamber 40, the recess 55 in the valve member places the port 44 in communication with the port 46 to vent the sterilizer chamber and with the sterilizer chamber vented it is safe to open the sterilizer chamber to permit sterilized instruments to be removed from the sterilizer chamber and/or to permit unsterilized instruments to be placed in the sterilizer chamber.

Assuming that a new set of instruments is placed in the sterilizing chamber in preparation for sterilizing the instruments, the sterilizer chamber is closed and sealed and then the valve member 22 is rotated from the first limit position shown in FIG. 3 to the second limit position which is shown in FIG. 5 to permit the measuring chamber 40 to be emptied into the sterilizer chamber. When the valve member is turned to this second limit position the tilt of the measuring chamber 40 is reversed as indicated by broken lines in FIG. 2 and the tilt or inclination of the longitudinal portion 50 of the angular passage of the valve member is correspondingly reversed. The important fact is that at this reversed position of the measuring chamber 40, both the bottom wall of the measuring chamber and the bottom wall of the longitudinal leg 50 of the angular passage slope downward for gravity flow of liquid from the measuring chamber through the port 44 to the closed receptacle, the lowermost portion of the inner wall of the chamber being flush with the lowermost portion of the longitudinal leg 50 of the angular passage to avoid any possibility of trapping a residual quantity of liquid in the measuring chamber.

During the movement of the valve member 22 from its first limit position shown in FIG. 3 to its second limit position shown in FIG. 5 the radial leg 48 of the angular passage of the valve member momentarily communicates with the vent port 45 but the vent port does not serve any purpose at this time and the vent port is sufficiently elevated to prevent escape of liquid therethrough from the angular passage. On the return movement of the valve member from its second limit position to its first limit position, however, the vent port 45 does serve a purpose because at this time the measuring chamber is filled with vaporized germicide that replaced the liquid in the measuring chamber when the measuring chamber emptied through the dispensing port 44. Since the usual germicidal liquid is highly volatile and since the sterilizer chamber is heated, the pressure in the sterilizer chamber goes up abruptly when the liquid germicide is released into the sterilizer chamber and consequently the vapor in the measuring chamber may reach a pressure of 25 or 30 p.s.i. during the brief period in which the measuring chamber is in communication with the sterilizer chamber. As the radial leg 48 of the angular passage of the valve member passes the vent port 45 the pressurized vapor in the measuring chamber is vented to the atmosphere. Preferably the vent port 45 is positioned for only partial register with the radial leg 48 of the valve member 22 to reduce the abruptness of the venting of the measuring chamber. Thus when the valve member completes its return rotation back to the first limit position, the measuring chamber 40 is at substantially atmospheric pressure to avoid violent discharge of the pressurized vapor into the liquid reservoir.

It is obvious that the measuring valve may be used in conjunction with any closed tank or pressurized pipeline. FIG. 7, for example, shows three measuring valves 60 of the described construction mounted on top of a tank 62, the purpose of the three measuring valves being to dispense measured quantities of liquid additives into the tank. If it is not desirable to vent the tank 62 whenever one of the valves 60 is turned to its fill position, the lower vent ports 46 of the three valves 60 may be plugged up or, instead, may be provided with normally closed shut-off valves.

My description of the preferred embodiment of the invention in specific detail will suggest various changes, substitutions and other departures from my disclosure within the spirit and scope of the appended claims.

I claim:

1. In a valve to dispense a predetermined volume of liquid from a reservoir into a receptacle, the combination of:
   a valve body having a series of radial ports including an upper inlet port for connection to the reservoir for gravity flow from the reservoir to the valve body, a lower dispensing port for connection to the receptacle for gravity flow from the valve to the receptacle, and a radial vent port between said inlet port and said dispensing port;
   a valve member mounted in the valve body for rotation therein; and
   a measuring chamber mounted on the valve member for rotation therewith,
   said valve member having a peripheral port with a passage in the valve member from the peripheral port to the measuring chamber,
   said valve member being rotatable between a first position and a second position,
   said peripheral port of the valve member registering with said upper inlet port of the valve body at said first position to place the reservoir in communication with the measuring chamber,
   said peripheral port of the valve member registering with the lower dispensing port of the valve body at said second position of the valve member to place the measuring chamber in communication with the receptacle,
   said peripheral port of the valve member communicates with said vent port to vent the measuring chamber in the course of the rotation of the valve member between its first and second positions but said vent part is positioned to only partially register with the peripheral port of the valve member to restrict the flow to the vent port to prevent violent release of gaseous fluid from the measuring chamber through the vent port and
   said measuring chamber being tilted relative to the axis of the valve member to assume a downwardly tilted attitude at said first position of the valve member for gravity flow from the reservoir into the entire volume of the measuring chamber and to assume an upwardly tilted attitude at said second position of the valve member for gravity flow from the entire volume of the measuring chamber into the receptacle,
   whereby the valve member may be rotated from its second position to its first position to completely fill the measuring chamber from the reservoir and then may be rotated to its second position to completely empty the measuring chamber into the receptable.

2. A combination as set forth in claim 1 which includes cooperating stop means on the valve body and valve member respectively to limit the rotation of the valve member at its first and second positions respectively.

3. A combination as set forth in claim 1 in which said valve body has a second radial vapor outlet port and said valve member has a second passage therein separate from the first mentioned passage, said second passage being in the form of a recess in the periphery of the valve member and being positioned in the valve member to place said dispensing passage in communication with said second vapor outlet port at a position of the valve member in its range of rotation,
   whereby said second vapor outlet may be placed in communication with the atmosphere and said valve member may be rotated to a position to release pressurized vapor from the receptacle into the second vapor outlet port.

4. A combination as set forth in claim 1 in which the valve body has a tapered bore for the valve member;
   in which said valve member is correspondingly tapered;
   and which includes spring means acting between the valve body and the valve member to bias the tapered valve member tightly into the tapered bore.

5. A combination as set forth in claim 4 in which said bore and said valve member taper towards one end of the valve member;
   and in which said spring is a coil spring surrounding the valve member under compression between the valve member and the valve body.

6. A combination as set forth in claim 1 in which said passage in the valve member is tilted relative to the axis of the valve member in the same respect as the measuring chamber to favor release of air from the measuring chamber to said peripheral port of the valve member.

7. A combination as set forth in claim 6 in which at said first position of the valve member, the tilted upper surface of said measuring chamber at the juncture of the passage of the valve member with the measuring chamber is at least approximately as low as the upper surface of the passage to avoid trapping gaseous fluid in the measuring chamber.

8. A combination as set forth in claim 7 in which at said first position of the valve member the tilted upper surface of the valve chamber is substantially in alignment with the tilted upper surface of said passage of the valve member.

9. In a valve having a first upper inlet port for connection to a source of liquid, a second port for communication with a measuring chamber and a third lower port for communication with a receptacle that confines a gaseous fluid under pressure and having a valve member with a passage therein to place said first upper inlet port in communication with the measuring chamber at a first position of the valve member for the purpose of filling the measuring chamber with liquid from the source and to place the measuring chamber in communication with the third lower port at a second position of the valve member to empty the measuring chamber through the third port,
   the improvement comprising:
   said measuring chamber being united with the valve member for rotation therewith,
   both said measuring chamber and said passage in the valve member being tilted at substantially the same angle relative to the axis of the valve member with both tilted relative to horizontal upward towards said upper inlet port at said first position of the valve member to favor release of gaseous fluid from the measuring chamber through the passage of the valve member to said upper inlet port, the range of rotation of the valve member from its first position to its second position being sufficient to reverse the tilt of both the measuring chamber and of the passage in the valve member to favor gravity flow of liquid from the measuring chamber into the receptacle.

10. In a valve to dispense a predetermined volume of liquid from a reservoir into a receptacle, the combination of:
    a valve body having
      a series of radial ports including
        an upper inlet port for connection to the reservoir for gravity flow from the reservoir into the valve body,
        a lower dispensing port for connection to the receptacle for gravity flow from the valve body to the receptacle,
        a first vent port intermediate said inlet port and said dispensing port, and
        a second vent port adjacent said dispensing port and
      an axial bore substantially centrally located therein such that said radial ports are each in communication therewith and
    a valve spool positioned within said axial bore for rotation therein having
      a radial port located so as to be alignable with said inlet and dispensing ports and partially alignable with said first vent port upon rotation of said valve spool,
      a passage therein extending substantially in the direction of the axis of said valve spool and in communication with said radial port but at a predetermined acute angle relative to the axis and said radial port, and a second position in which said dispensing port and said radial port are in substantial alignment and each other port is closed off from communication with any other port by the periphery of said valve spool.

11. The valve of claim 10 including measuring chamber means attached to said valve spool for rotation therewith in eccentric relationship relative thereto and in communication with said passage having an inner wall therein which is substantially coplanar with one portion of the periphery of said passage.